US008463309B2

(12) United States Patent
Malladi et al.

(10) Patent No.: US 8,463,309 B2
(45) Date of Patent: *Jun. 11, 2013

(54) METHOD AND APPARATUS FOR UPLINK RATE SELECTION IN THE PRESENCE OF MULTIPLE TRANSPORT CHANNELS IN A WIRELESS COMMUNICATION SYSTEM

(75) Inventors: Durga Prasad Malladi, San Diego, CA (US); Serge D. Willenegger, Onnens (CH)

(73) Assignee: Qualcomm Incorporated, San Diego, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/731,008

(22) Filed: Mar. 24, 2010

(65) Prior Publication Data
US 2010/0178952 A1 Jul. 15, 2010

Related U.S. Application Data

(60) Division of application No. 11/563,518, filed on Nov. 27, 2006, now Pat. No. 7,881,333, which is a continuation of application No. 10/921,466, filed on Aug. 18, 2004, now Pat. No. 7,161,916.

(60) Provisional application No. 60/496,952, filed on Aug. 20, 2003.

(51) Int. Cl.
*H04B 7/185* (2006.01)
*H04B 7/00* (2006.01)

(52) U.S. Cl.
USPC .......................................... 455/522; 370/318

(58) Field of Classification Search
USPC .......................................... 455/522; 370/318
See application file for complete search history.

(56) References Cited

U.S. PATENT DOCUMENTS 5,528,593 A * 6/1996 English et al. ................ 370/391
6,148,208 A 11/2000 Love et al.
(Continued)

FOREIGN PATENT DOCUMENTS

JP 2001332987 A 11/2001
JP 2004501549 1/2004
(Continued)

OTHER PUBLICATIONS

Taiwan Search Report—TW093125237—TIPO—Jun. 28, 2011.
(Continued)

*Primary Examiner* — Bobbak Safaipour
(74) *Attorney, Agent, or Firm* — S. Hossain Beladi (57) ABSTRACT

Systems and methods for selecting data rates at which to transmit data over a primary uplink in the presence of one or more secondary uplink channels. One embodiment comprises a method including determining probabilities associated with numbers of attempted transmissions of data, determining the number of times pending data transmissions have been attempted, determining probabilities associated with the data transmissions, and allocating power for transmission of the data in a succeeding frame based upon the associated probabilities. In one embodiment, a highest supportable data rate for a primary uplink is initially selected. Then, power is allocated for a minimum set of channels on the primary uplink. Then, power is allocated for pending data transmissions on the secondary uplink. A maximum power level for the transceiver is then adjusted to account for the allocated power, and the highest supportable data rate for the primary uplink is recomputed.

28 Claims, 4 Drawing Sheets

U.S. PATENT DOCUMENTS

| | | |
|---|---|---|
| 6,317,854 B1 | 11/2001 | Watanabe |
| 6,400,960 B1 | 6/2002 | Dominique et al. |
| H2033 H * | 7/2002 | Masak et al. ................. 342/383 |
| 6,628,637 B1 * | 9/2003 | Li et al. ......................... 370/342 |
| 6,710,702 B1 | 3/2004 | Averbuch et al. |
| 6,823,005 B1 | 11/2004 | Chuang et al. |
| 6,882,857 B2 | 4/2005 | Zhang et al. |
| 7,161,916 B2 | 1/2007 | Malladi et al. |
| 7,203,461 B2 | 4/2007 | Chang et al. |
| 7,447,516 B2 | 11/2008 | Heo et al. |
| 7,583,625 B2 | 9/2009 | Bennett |
| 7,596,122 B2 | 9/2009 | Han et al. |
| 7,643,419 B2 | 1/2010 | Terry et al. |
| 7,881,333 B2 | 2/2011 | Malladi et al. |
| 7,933,571 B2 | 4/2011 | Black et al. |
| 7,936,741 B2 | 5/2011 | Vimpari et al. |
| 7,953,018 B2 | 5/2011 | Kim et al. |
| 8,320,307 B2 | 11/2012 | Niwano |
| 2001/0014091 A1 | 8/2001 | Yamada et al. |
| 2001/0023189 A1 | 9/2001 | Kajimura |
| 2001/0034851 A1 * | 10/2001 | Randahl et al. ............... 713/320 |
| 2002/0016178 A1 * | 2/2002 | Kito ............................... 455/522 |
| 2002/0034170 A1 | 3/2002 | Tiedemann, Jr. et al. |
| 2002/0154610 A1 | 10/2002 | Tiedemann, Jr. et al. |
| 2002/0167907 A1 | 11/2002 | Sarkar et al. |
| 2003/0012128 A1 | 1/2003 | Miyoshi et al. |
| 2003/0031203 A1 | 2/2003 | Fukui |
| 2003/0078010 A1 | 4/2003 | Davis |
| 2003/0112821 A1 | 6/2003 | Cleveland et al. |
| 2004/0203383 A1 | 10/2004 | Kelton et al. |
| 2004/0218559 A1 | 11/2004 | Kim et al. |
| 2004/0219920 A1 | 11/2004 | Love et al. |
| 2006/0140115 A1 | 6/2006 | Timus et al. |
| 2011/0144818 A1 * | 6/2011 | Li et al. ......................... 700/291 |
| 2012/0077539 A1 | 3/2012 | Malladi et al. |

FOREIGN PATENT DOCUMENTS

| | | |
|---|---|---|
| JP | 2005505148 T | 2/2005 |
| WO | WO0139443 A1 | 5/2001 |
| WO | WO0189099 A2 | 11/2001 |
| WO | WO0245291 A1 | 6/2002 |
| WO | 02056631 A1 | 7/2002 |
| WO | WO02065664 A2 | 8/2002 |

OTHER PUBLICATIONS

International Search Report and Written Opinion—PCT/US04/029250, International Searching Authority—European Patent Office, Dec. 21, 2004.

* cited by examiner

METHOD AND APPARATUS FOR UPLINK RATE SELECTION IN THE PRESENCE OF MULTIPLE TRANSPORT CHANNELS IN A WIRELESS COMMUNICATION SYSTEM

CLAIM OF PRIORITY UNDER 35 U.S.C. §120

The present application for patent is a Divisional of prior application Ser. No. 11/563,518 filed Nov. 27, 2006 which is a continuation of prior application Ser. No. 10/921,466 filed Aug. 18, 2004, issued as U.S. Pat. No. 7,161,916, which claims the benefit of Provisional Application No. 60/496,952 filed Aug. 20, 2003, and assigned to the assignee hereof and hereby expressly incorporated by reference herein.

BACKGROUND

1. Field

The present invention relates generally to communication systems, and more particularly, to systems and methods for uplink rate selection in the presence of multiple transport channels in a wireless communication system.

2. Background

An exemplary wireless telecommunications system may be designed in accordance with the 3GPP standard, Release 99, which is known to those of skill in the art and is hereby incorporated by reference. In this system, a base station controller is coupled to a plurality of base transceiver stations, or base stations. There may be many base stations that are coupled to the base station controller. The base station controller is typically coupled to the base stations through a network that is typically referred to as the backhaul network.

Each base station is capable of communicating with a plurality of mobile stations that are within a coverage area associated with the base station. Again, there may be many mobile stations in the base station's coverage area that are communicating with the base station. The mobile station communicates with the base station via a wireless link. The wireless link includes a set of channels for communicating data from the base station to the mobile station, as well as a set of channels for communicating data from the mobile station to the base station. The first set of channels (from base station to mobile station) are referred to as the forward link. The second set of channels (from mobile station to base station) are referred to as the reverse link.

In this system, when the mobile station has data that it needs to transmit to the base station, a request is transmitted from the mobile station to the base station. This request is a request for permission to transmit the mobile station's data to the base station. After the base station receives the request, it may issue a grant to the mobile station in response to the request. The grant allows the mobile station to transmit data to the base station at up to a specified maximum data rate for an allotted interval.

When the grant is received by the mobile station, the mobile station determines an appropriate rate at which to transmit its data, and then transmits the data over a dedicated data channel at the selected rate during the allotted interval. The mobile station selects a data rate at which to transmit data on the dedicated data channel based in large part on its power constraints. For example, in this system, the mobile station has a maximum power (e.g., 125 milliwatts) with which it can transmit its data, so a data rate is selected that is not expected to cause the mobile station to exceed its maximum power level. In this system, the mobile station's history (with respect to the amount of power required to transmit at a given data rate) is viewed to determine the maximum allowable data rate corresponding to a power level that is below the maximum level.

This simple method of selecting a data rate, however, accounts for only a single channel (the dedicated data channel) and does not provide an acceptable methodology for rate selection if the mobile station will be transmitting data over multiple channels. It would therefore be desirable to provide systems and methods for selecting data rates in the presence of multiple channels.

SUMMARY

Embodiments of the invention which are disclosed herein address one or more of the needs indicated above by providing a mechanism for selecting data rates at which to transmit data over a primary uplink in the presence of one or more secondary uplink channels.

One embodiment comprises a method implemented in a remote transceiver of a wireless communication system, wherein the transceiver is configured to retransmit pending data on a secondary uplink until the data is acknowledged or until a maximum number of retransmissions are made. The method includes determining probability values associated with the numbers of attempted transmissions of the data and, for each of a plurality of pending data transmissions, determining the number of times transmission of the data has been attempted, determining a probability associated with the number of attempts, and allocating power for transmission of the data in a succeeding frame based upon the probability associated with the number of transmission attempts.

In one embodiment, the method includes initially selecting a highest supportable data rate for a primary uplink using a conventional methodology. In this methodology, the data rate is selected by determining which data rates would have been supported in a set of preceding frames and then selecting the highest of these rates. After the initial data rate for the primary uplink is determined, power is allocated for a minimum set of channels on the primary uplink. Then, power is allocated for pending data transmissions on the secondary uplink. A maximum power level for the transceiver is then adjusted to account for the allocated power, and the highest supportable data rate for the primary uplink is recomputed.

An alternative embodiment comprises a transceiver configured to communicate data via a wireless communication link. In this embodiment, the transceiver is configured to retransmit pending data on a secondary channel until the data is acknowledged or until a maximum number of retransmissions are made. The transceiver is further configured to determine probability values associated with one or more numbers of attempted data transmissions. Then, for each of a plurality of pending data transmissions, the transceiver determines a number of times the data transmission has been attempted in one or more preceding frames, determines a probability associated with the number of times the data transmission has been attempted, and allocates power for the data transmission in a succeeding frame based upon the probability associated with the number of times the data transmission has been attempted.

Yet another alternative embodiment comprises a storage medium, readable by a processor, which contains program instructions to cause the processor to perform a method as described above. In one embodiment, the processor is a component of a wireless transceiver, and the instructions on the storage medium configure the processor to determine probability values associated with numbers of attempted data transmissions and, for each of a plurality of pending data transmissions, determine a number of times the data transmission has been attempted, determine a probability associated with the number of attempts, and allocate power for the data transmission in a succeeding frame based upon the probability associated with the number of transmission attempts.

Numerous alternative embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for selecting data rates at which to transmit data over a primary uplink in the presence of one or more secondary uplink channels. In one embodiment, a wireless communications system uses multiple channels to transmit data between a base station and a mobile station. The channels include multiple forward link channels for transmitting data from the base station to the mobile station, as well as multiple reverse link channels for transmitting data from the mobile station to the base station. The mobile station in this system takes into account historical information, as well as expected requirements, relating to data rates and transmission power in order to select data rates at which to transmit data to the base station via the reverse link channels.

In this embodiment, the mobile station determines which of a set of possible data rates are supported for a first (e.g., dedicated data) channel, based on data transmissions in a preceding frame interval and the relationship of these transmissions to a maximum power level. The mobile station also determines estimated power requirements for a second (e.g., enhanced uplink) channel, based upon transmissions that are expected to be made on this channel in an upcoming frame. The mobile station then reserves power for a minimum set of channels that are to be transmitted on the first channel, reserves power for the data expected to be transmitted on the second channel, and computes the highest data rate that can still be supported on the first channel after power is reserved for the data to be transmitted on the second channel.

One embodiment of the invention is implemented in a wireless telecommunications system that is designed in accordance with various releases of the 3GPP standard, including Release 99 and Release 6. It will therefore be helpful to describe the basic structure and operation of such a system in order to aid in the understanding of the invention. It should be noted that, while the following description focuses primarily upon a system that follows this standard, alternative embodiments may be implemented in systems that follow other standards as well.

Figure 1:
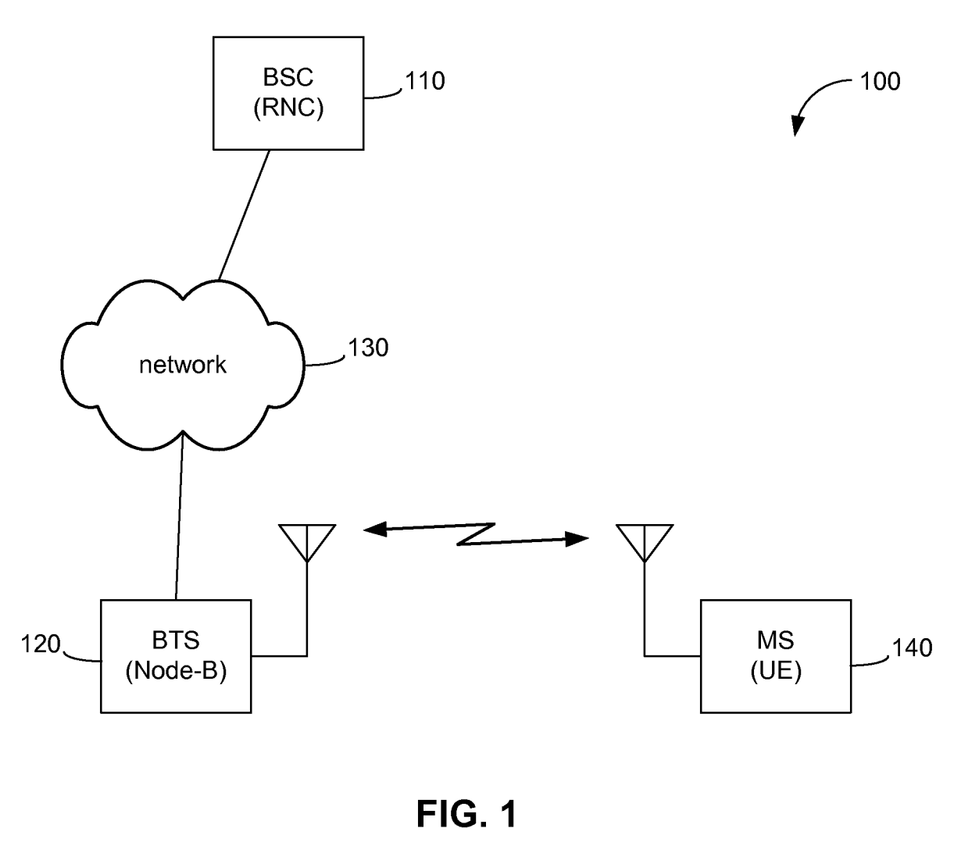
FIG. 1 is a diagram illustrating the structure of a wireless telecommunications system in accordance with one embodiment.

Referring to FIG. 1, a diagram illustrating the structure of a wireless telecommunications system in accordance with one embodiment is shown. System 100 includes a base station controller 110, a base station 120 that is coupled to base station controller 110 through a backhaul network 130, and a mobile station 140. System 100 may include additional base stations and mobile stations which, for purposes of clarity, are not shown in the figure.

The terminology used to refer to the components of the system differs slightly in the various releases of the 3GPP standard. For example, base station controller 110 may be referred to as a radio network controller (RNC), base station 120 may be referred to as a "Node B," and mobile station 140 may be referred to as user equipment (UE). Because the various embodiments of the invention may be implemented in different types of wireless communication systems (e.g., systems designed according to different standards or different releases of the same standard,) references to the different components of the systems should be interpreted broadly, and references to particular components using terminology applicable to a particular type of system should not be construed to imply that the embodiments of the invention are limited to that particular type of system.

Referring again to the system depicted in FIG. 1, if mobile station 140 has data that needs to be transmitted to base station 120, it transmits a request to base station 120, asking for authorization to transmit this data. In response to the request, base station 120 may transmit a grant to mobile station 140. The grant authorizes mobile station 140 to transmit data to base station 120 at up to a specified data rate. After mobile station 140 receives the grant, it may begin transmitting data to base station 120 during a succeeding radio frame.

Mobile station 140 typically is not stationary (although, in some instances, it may be.) Mobile station 140 is instead likely to move with respect to base station 120. The changing position of mobile station 140 typically causes the channel conditions for the wireless link between mobile station 140 and base station 120 to vary. The channel conditions may also be affected by other factors, such as atmospheric conditions, movement of other objects between mobile station 140 and base station 120, interference from other transmitters, and so on.

It should be noted that, while the description herein of this and other embodiments focuses on a system in which a mobile station may move with respect to a base station, other embodiments may be implemented in systems that enable wireless communication between alternative types of devices. It is not necessary that one of the devices be a "base station," nor is it necessary that the other of the devices be "mobile." References herein to mobile stations and base stations should therefore be construed to include any wireless transceiver devices that are in communication with each other.

Because of the changes in the channel conditions for the wireless communication link, there may be changes in the data rate at which mobile station 140 transmits data to base station 120. These changes in the data rates used by mobile station 140 to transmit the data are necessary to provide a high enough signal-to-noise ratio, SNR, (or signal-to-interference-and-noise ratio, SINR,) that base station 120 will receive the data with an acceptable error rate. The better the channel conditions, the higher the data rate that can be used by the mobile station. The worse the channel conditions, the lower the data rate that typically needs to be used by the mobile station.

The data rate at which mobile station 140 can transmit data is limited not only by the channel conditions, but also by the power constraints of the mobile station. The power required to transmit data at a particular rate is proportional to the data rate. Thus, it takes less power to transmit at a lower data rate than is needed to transmit data at a higher data rate. This is important because mobile station 140 is typically allowed to transmit data at or below a maximum power level. For instance, in one embodiment, mobile stations are allowed to transmit data using up to a maximum of 125 milliwatts.

In Release 99, the data rate for a particular channel is also referred to as a transport format (TF). Because the dedicated physical data channel of Release 99 actually includes multiple logical or virtual channels, a particular combination of data rates (or transport formats) for these channels is referred to as the transport format combination (TFC). For purposes of clarity, individual transport formats as well as transport format combinations will be referred to below simply as data rates.

The data rate for a particular channel is equal to the amount of data to be transmitted, divided by the transmit time interval, or TTI. The mobile station selects suitable data rates (a TFC) for the uplink channels from the set of possible data rates at each boundary between ten millisecond radio frames. The various possible TFCs can be collectively referred to as the TFC set, or TFCS.

As noted above, there are limitations on the amount of power that can be used by mobile station 140 to transmit data. There is therefore a corresponding limit on the rates at which the data can be transmitted. If the power that is required to transmit data at a particular rate (or with a particular TFC) does not exceed the maximum allowable power level, then that particular data rate is supported within the power constraints of the mobile station. In other words, a mobile station operating at or below its maximum allowable power can support data transmissions at that data rate. If, on the other hand, transmitting data at that particular rate will cause the mobile station to exceed its maximum power level, the data rate is, generally speaking, not supported.

Figure 2:
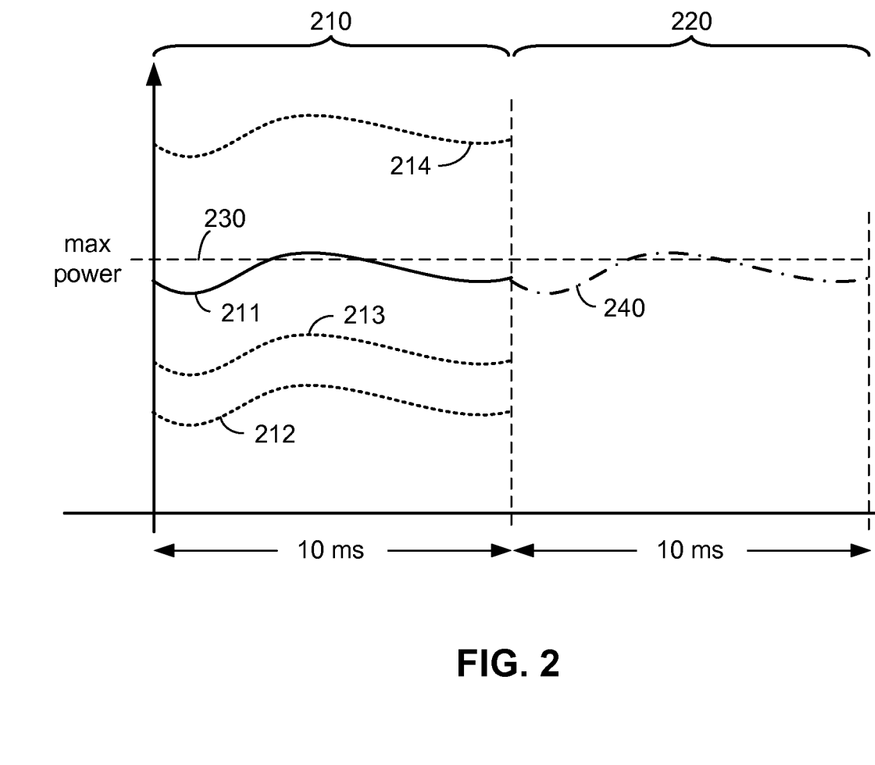
FIG. 2 is a diagram illustrating the power used by a mobile station to transmit data to a base station in one embodiment.

Referring to FIG. 2, a diagram illustrating the power used by a mobile station to transmit data to a base station in one embodiment is shown. In this embodiment, data is transmitted from mobile station 140 to base station 120 over a ten millisecond radio frame 210. The data is transmitted using a selected data rate (TFC,) and a corresponding amount of power is used to transmit the data at this rate. Curve 211 indicates the power actually used by mobile station 140 to transmit the data. It can be seen that the power used to transmit the data varies over the interval covered by frame 210 to compensate for variations in the channel conditions. The power used by mobile station 140 does not exceed the mobile station's maximum power level (indicated by dashed line 230). The particular data rate used by mobile station 140 to transmit the data is therefore supported.

The question of whether a particular data rate can be supported in the next frame cannot be answered with certainty because the data has yet to be transmitted, and it cannot be known with certainty what the channel conditions will be in the future (i.e., when the data is actually transmitted.) The determination of whether or not each possible data rate is supported is therefore based upon the recent history of the mobile station's data transmissions. More specifically, the mobile station examines the amount of power that was required to transmit data at a particular rate during a previous interval, and makes the assumption that the channel conditions and corresponding power requirements for each data rate will be approximately the same. Thus, if a data rate was supported during the previous interval, it is assumed that the data rate will be supported during the succeeding interval.

Referring again to FIG. 2, several different curves are depicted within frame 210. As noted above, curve 211 illustrates the power actually used by mobile station 140 to transmit data during the frame. As also noted above, this curve is below maximum power level 230, so the corresponding data rate is considered to be supported. Curves 212, 213 and 214 illustrates the power that would have been used to transmit the same data under the same channel conditions, but at different data rates. Curves 212 and 213 correspond to lower data rates and consequently would have required less power to transmit the data. These data rates are therefore supported. Curve 214, on the other hand, corresponds to a higher data rate than was actually used and would have required more power. As shown in the figure, this curve is entirely above maximum power level 230, and therefore would not have been supported.

In Release 99, ten millisecond frames are used to transmit data. The Release 99 standard specifies that the mobile station will examine the power of the data transmissions during the previous twenty milliseconds and, based upon this information, will determine whether each of the possible data rates (TFCs) is supported. In the example of FIG. 2, the data rates corresponding to curves 211-213 are supported, while the data rate corresponding to curve 214 is not. The mobile station will then select the highest of the supported data rates (211 in this example) and, if the selected data rate is less than or equal to the maximum rate specified in a grant from the base station, this highest supported rate will be used to transmit data during the next ten millisecond frame (as shown by curve 240.) If the highest supported data rate is greater than the maximum rate specified in the grant, the mobile station will select the highest of the supported data rates that is less than or equal to the maximum rate specified in the grant.

This scheme for selecting the data rate at which the mobile station will transmit data to the base station is a straightforward and is suitable for implementation in Release 99 because there is only a single, dedicated channel on which data will be transmitted. This is the only channel that needs to be considered in determining the rate at which data can be transmitted. In a system designed according to a later release of this standard (Release 6,) however, an enhanced uplink is defined. The enhanced uplink includes additional reverse-link channels on which data can be transmitted from the mobile station to the base station. In order to enable the mobile station to transmit data over this additional channel, while remaining within the power constraints of the mobile station, it is desirable to take the additional channel into account when selecting a data transmission rate.

If the additional channels of the enhanced uplink were managed in the same way as the dedicated data channel of the Release 99 uplink, it might be possible to use a scheme similar to the one described above to select a data transfer rate. That is, it might be possible to assume that channel conditions will be the same as in the recent history of the mobile station, and to allocate power for the data to be transmitted based upon the history of the channel conditions. The channels of the enhanced uplink, however, are not used in the same way as the channels of the Release 99 uplink. Some of these differences are explained below with respect to FIG. 3.

Figure 3:
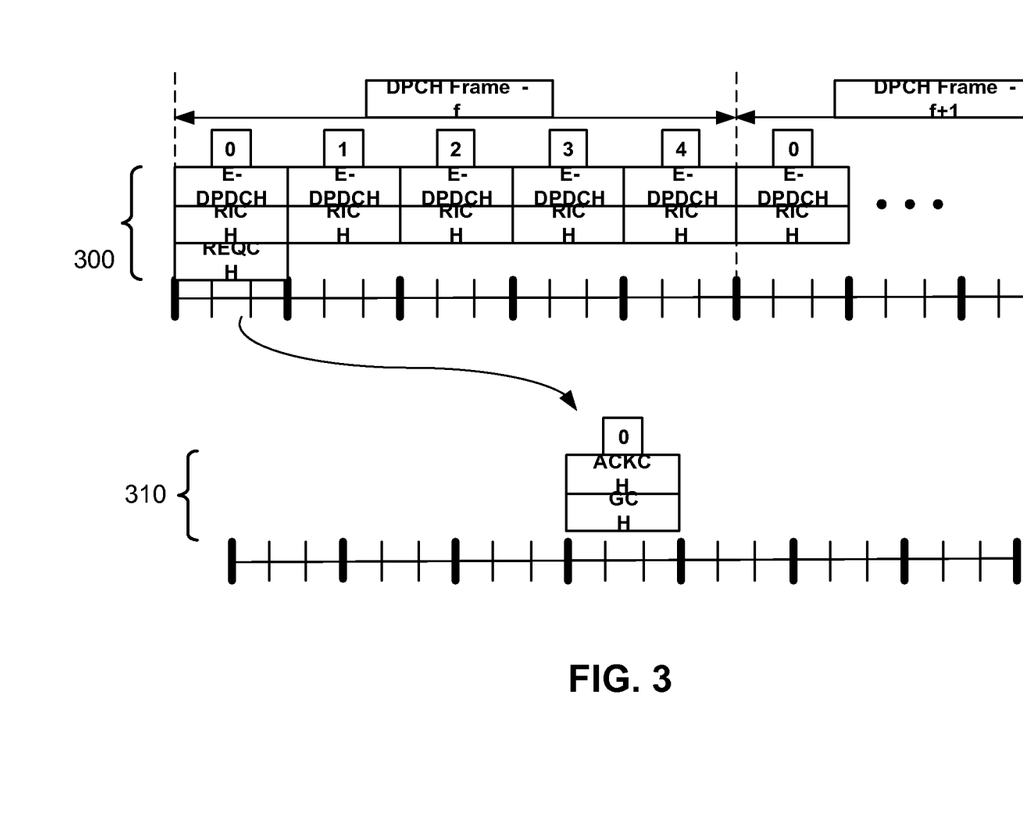
FIG. 3 is a diagram illustrating the timing of transmissions over the channels of the enhanced uplink in accordance with one embodiment.

Referring to FIG. 3, a diagram illustrating the timing of transmissions over the channels of the enhanced uplink is shown. Reference number 300 indicates the transmissions of data from the mobile station to the base station on the enhanced uplink, while reference number 310 indicates transmissions from the base station to the mobile station via a downlink.

In this embodiment, the enhanced uplink channels include an enhanced data channel (E-DCH), a rate indicator channel (RICH), a request channel (REQCH) and a secondary pilot channel (SPICH). It can be seen from the figure that in one embodiment the enhanced uplink channels use two millisecond subframes, rather than the ten millisecond frames used by the Release 99 data channels. Each two millisecond subframe has three slots, for a total of 15 slots in each frame. The enhanced data channel may be transmitted by HARQ (hybrid automatic repeat request) processes in each two millisecond subframe. Rate indicator information can be transmitted corresponding to each of the HARQ processes. If a request is transmitted by the mobile station, it is transmitted via the request channel during the first two millisecond subframe within the ten millisecond frame.

The enhanced uplink implements a hybrid automatic repeat request, or HARQ, mechanism. This mechanism is used by the mobile station to automatically repeat transmissions of data that are not acknowledged by the base station. The series of transmissions of a frame of data comprise a HARQ process. Thus, in a HARQ process, when data is transmitted from the mobile station to the base station using the data channel of the enhanced uplink, the base station receives the data, decodes the data and then transmits an acknowledgment (ACK) to the mobile station. When the mobile station receives the acknowledgment, it knows that the data that it transmitted to the base station was successfully received and decoded. In this case, the mobile station is done with the transmitted data (i.e., the HARQ process is terminated.)

If, on the other hand, the base station receives, but does not successfully decode the data, the base station will transmit a non-acknowledgment (NAK) to the mobile station. When the mobile station receives the non-acknowledgment, it knows that the data was not successfully received and decoded. The mobile station must therefore re-transmit this data (i.e., the HARQ process is continued.) The same is true if neither an acknowledgment or a non-acknowledgment is received by the mobile station. In one embodiment, the mobile station will attempt to re-transmit the data a predetermined number of times. If the transmission is still unsuccessful after the predetermined number of re-transmissions, the data will be dropped, terminating the HARQ process.

There are several factors that complicate the selection of a suitable data rate for transmission of data on the enhanced uplink. One such factor is that the presence or absence of each of the enhanced uplink channels is probabilistic. In other words, each of these channels may or may not be used in a given frame. For example, it may or may not be necessary in the next frame to transmit a request to the base station via the request channel.

Another related complicating factor is the implementation of the HARQ mechanism. As pointed out above, this mechanism provides for the automatic retransmission of data that is not acknowledged by the base station as having been successfully received and decoded. This is problematic because the successful receipt of data cannot be immediately acknowledged. Time is required to transmit the corresponding data from the mobile station to the base station, to decode the data, to determine that the data has been successfully received and decoded, and to transmit an acknowledgment back to the mobile station. This delay is illustrated in FIG. 3.

As shown in FIG. 3, HARQ process 0 is transmitted by the mobile station in the first two millisecond slot of frame f. The acknowledgment of HARQ process 0 is received approximately 3½ slots (seven milliseconds) later. Thus, in the case of HARQ process 0, the acknowledgment is received within the span of frame f. The mobile station therefore knows whether it will need to retransmit the data of HARQ process 0 when the data rate is selected at the boundary between frames f and f+1. This is not a problem. The problem relates to the acknowledgment of HARQ processes 1-4. The acknowledgment of any of these HARQ processes cannot be received within the same frame. As a result, when a data rate is selected at the boundary between frames f and f+1, it is not known whether any of HARQ processes 1-4 was successfully received by the base station. The mobile station therefore does not know whether or not it needs to retransmit the corresponding data. The mobile station can only guess as to whether this data needs to be transmitted and how much power might need to be allocated to these transmissions.

At each frame boundary, the mobile station knows only whether the following channels will be transmitted in the succeeding frame: E-DPDCH, RICH and SPICH for HARQ process 0; if REQCH and E-DPDCH was not transmitted during slots 3-14 of frame f, then the E-DPDCH, RICH and SPICH will not be transmitted during the corresponding slots of frame (f+1); if REQCH was transmitted during slots 3-14 of frame f, then the E-DPDCH, RICH and SPICH could be transmitted during the corresponding slots of frame (f+1); and if E-DPDCH was transmitted during slots 3-14 of frame f and the transmission was not the last one, then the E-DPDCH, RICH and SPICH could be re-transmitted during the corresponding slots of frame (f+1).

Because the mobile station does not know whether or not any other data will be transmitted on the enhanced uplink channels, the simple data rate selection scheme used for the Release 99 uplink cannot be directly applied. If assumptions about the enhanced uplink transmissions are made, however, this scheme can be applied. For instance, it can be assumed that no data will be transmitted on the enhanced uplink channels in the next frame. The problem with this assumption is that the mobile station may not be able to make necessary transmissions of data on the enhanced uplink channels. Conversely, it can be assumed that all of the possible enhanced uplink channel transmissions are made in each frame. The problem with this assumption is that the enhanced uplink channels are not always needed, so some of the enhanced uplink bandwidth is unused, while the Release 99 uplink channels may not have enough bandwidth. It therefore appears that an assumption which is intermediate to these two extremes would be most reasonable.

One embodiment implements a scheme that takes into account the probabilistic nature of the HARQ retransmissions. For the portions of the data transmissions that are not known, this scheme makes an estimate of the amount of data that will be transmitted. Similar to the Release 99 scheme, the estimate is based on historical information, but the historical information does not concern the channel conditions. Instead, the historical information concerns the HARQ retransmissions of the data.

As noted above, the data for a particular HARQ process is transmitted from the mobile station to the base station and, if the transmission is not acknowledged, the data is re-transmitted. In this embodiment, the retransmissions are tracked to identify the probability with which each HARQ process will be retransmitted. More specifically, the long term residual block error rate (BLER) is tracked. For each transmission (or retransmission,) there is a corresponding probability that the data will need to be transmitted again in the next frame.

For example, for each HARQ process that has been transmitted only once may have a 90% probability of having to be transmitted again. For each HARQ process that has been transmitted twice, the probability of retransmission may be 50%. Each succeeding number of transmissions has an associated probability of transmission in the next frame. Generally speaking, the more times transmission of a HARQ process has been attempted, the lower the likelihood will be that this process will need to be transmitted again in the next frame. As noted above, the number of transmissions is limited, so after the last transmission, the probability of transmitting the data again in the next frame will be 0.

The mobile station uses this probability information to determine whether each of the non-acknowledged HARQ processes will need to be retransmitted. For each of these processes, the mobile station determines the number of times that process has been transmitted, determines the probability associated with this number of transmissions, and either allocates or does not allocate power for transmission of this process based upon the associated probability.

Thus, for example, assume that retransmission of each HARQ process will be attempted up to four times. Assume further that the probabilities that these processes will need to be transmitted in next frame is as shown in the table below.

| No. of times process has been transmitted | probability process will have to be transmitted in the next frame |
| --- | --- |
| 0 | 100% |
| 1 | 90% |
| 2 | 50% |
| 3 | 15% |
| 4 | 0% |

If data for a particular HARQ process has not yet been transmitted from the mobile station to the base station, the probability that this process will need to be transmitted in the next frame is 100%. The mobile station therefore allocates power for transmission of this process. If, on the other hand, the HARQ process being considered has already been transmitted once, the probability that the process will need to be transmitted again in the next frame is only 90%. The mobile station will therefore allocate power for transmission of this process with a 90% probability. If the data corresponding to the process has been transmitted four times, no power will be allocated to transmit this data again.

The allocation of power with a particular probability does not mean that the mobile station will allocate only a portion of the power required for transmission of the process. Instead, the mobile station will either allocate all of the power required for the transmission or none of the required power. For example, when there is a 90% chance the data will need to be retransmitted, the mobile station will allocate power 90% of the time, and will not allocate power 10% of the time. In one embodiment, this is accomplished by generating a random number between 0 and 1, and then allocating power for the process if the generated number is between 0 and 0.9, or not allocating power for the process if the generated number is between 0.9 and 1.

Because, in the embodiment described above, the mobile station transmits data on both the enhanced uplink channels and the release 99 uplink channels, this power allocation scheme for the enhanced uplink is used in conjunction with a modified version of the Release 99 data rate selection scheme. The resulting scheme is illustrated in FIG. 4.

Figure 4:
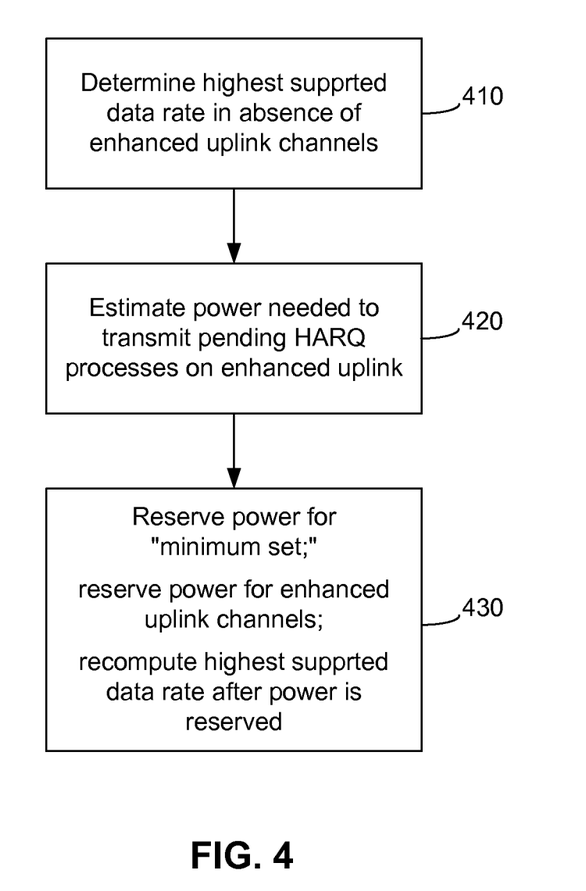
FIG. 4 is a flow diagram illustrating a method in accordance with one embodiment.

Referring to FIG. 4, a flow diagram illustrating a method in accordance with one embodiment is shown. In this embodiment, the mobile station first determines the highest supported data rate (block 410.) The mobile station then determines the amount of power that will be needed to transmit pending HARQ processes on the enhanced uplink (block 420.) The mobile station then reserves power for a "minimum set" of channels on the Release 99 uplink, reserves power for the pending HARQ processes as determined in block 420, and then determines the highest data rate that is still supported after power is reserved for the pending HARQ processes on the enhanced uplink (block 430.)

Determining the highest supported data rate in block 410 is performed in the conventional manner. In other words, information on the previous ten millisecond frame is examined and to the highest supportable data rate for the data channels is determined. This is the same scheme as is used in Release 99. The enhanced uplink channels are ignored for the purpose of determining the highest supportable data rate. This is the same scheme as is used in Release 99, so this embodiment is backwards-compatible with systems based on Release 99.

In Release 99, the mobile station selects a TFC from its current TFCS whenever it has data to transmit in the uplink. The TFC is selected based on the data in the mobile station's buffer, the currently available transmission power, the available TFCS and the mobile station's capabilities.

Each TFC in the available TFCS is in one of three states: supported; excess-power; or blocked. A TFC in the supported state can be used for transmission of data in the uplink. A TFC in the excess-power state would require more than the maximum allowable power, and consequently will not be selected for transmission of data in the uplink. A TFC in the blocked state likewise requires too much power, and will not be selected for uplink transmissions.

Based on certain parameters, the mobile station continuously evaluates elimination, recovery and blocking criteria according to which TFCs can move between the supported, excess-power and blocked states. The mobile station considers the elimination criteria for a TFC if the estimated mobile station transmit power needed for this TFC is greater than the maximum mobile station transmitter power for at least a certain portion of a number of slots immediately preceding evaluation. The mobile station considers this TFC to be in an excess-power state. The mobile station considers the blocking criteria for a TFC if it stays in the excess-power state for a certain period of time. The mobile station considers the recovery criterion for a TFC if the estimated mobile station transmit power needed for this TFC has not been greater than the maximum mobile station transmitter power for a certain number of slots immediately preceding evaluation. The mobile station considers this TFC to be in the supported state.

In block 420, the mobile station determines the power requirements for the enhanced uplink. This includes determining the power requirements for the data that the mobile station knows will be transmitted (e.g., retransmissions of pending HARQ process 0,) as well as determining power requirements for data that may or may not be transmitted (e.g., retransmissions of pending HARQ processes 1-4.) The power requirements determined in this embodiment are the average power requirements over a frame, rather than the peak power.

The amount of power that is expected to be used to transmit data on the enhanced uplink is computed in the following manner. First, several variables are defined.

$f$ = Frame number $m$ = Slot number
$= 15 \cdot f + s$
$0 \leq s \leq 14$ $H$ = Number of HARQ processes Further, several functions are defined.

$P_s(k; f)$ = DPCCH Transmit power during slot $k$ of frame $f$, where DPCCH is a dedicated physical control channel of the Release99 uplink $P(f)$ = Average DPCCH Transmit power for frame $f$
$$= \frac{1}{15} \cdot \sum_{k=0}^{14} P_s(k; f)$$

$P_{av}(f)$ = Moving average (over $F$ frames) of DPCCH Transmit power for frame $f$
$$= \frac{1}{F} \cdot \sum_{k=0}^{F-1} P(f-k)$$

During frame f, the mobile station either sends a request or transmits E-DPDCH (the dedicated physical data channel of the enhanced uplink,) or both. The transmission during frame (f+1) depends upon this.

We then define several additional variables.

$I_r(j; f)$ = REQH Indicator function for HARQ process $j$ during frame $f$
$$= \begin{cases} 0 & \text{No request} \\ \phi & \text{Request made} \end{cases}$$
$0 \leq \phi \leq 1$ $r(j; f) =$ Requested E-DPDCH TF for HARQ process $j$ during frame $f$ $I_t(j; f)$ = E-DPDCH Transmission Indicator function for HARQ process $j$ during frame $f$
$$= \begin{cases} 0 & \text{No transmission or last re-transmission} \\ 1 & \text{Transmission made and could potentially re-transmit} \end{cases}$$

$\chi(j; f) = E - DPDCH\ TF$ for HARQ process $j$ during frame $f$

To compute the estimate of average required transmit power during frame (f+1), we have:
p(l)=Residual E-DPDCH BLER after l transmissions $1 \leq l \leq N_{max} - 1$ $N_{max}$=Maximum number of transmissions allowed
$N_e(j; f)$=E-DPDCH transmission number for HARQ process j during frame f Further, we define the amplitude scaling factors as:
$\beta_{d,i}$=Scaling factor for DPDCH TFC i
$\beta_{e,i}$=Scaling factor for E-DPDCH TF i
$\beta_c$=Scaling factor for DPCCH
$\beta_{\theta,i}$=Scaling factor for RICH+SPICH for E-DPDCH TF i The weighted probability of request and re-transmission can be written as:

$$q(j; f) = \frac{p(N_e(j; f))}{\sum_{j=0}^{H-1} p(N_e(j; f)) + \phi}$$

$$\xi = \frac{\phi}{\sum_{j=0}^{H-1} p(N_e(j; f)) + \phi}$$

To compute the maximum requested rate, define:

$S_r(f) = \{j: I_r(j; f) \cdot (1 - I_t(j; f)) > 0 \forall\ 0 \leq j \leq H - 1\}$
= Set of HARQ processes for which REQCH was transmitted during frame $f$ and no retransmission is pending during frame $(f + 1)$ $$j_m = \underset{r(j;f)}{\mathrm{argmax}}(\beta_{e,r(j;f)}^2 + \beta_{\theta,j;f}^2) \forall\ j \in S_r(f)$$

The predicted transmit power needed for frame (f+1) can be written as:

$P_e(f + 1; f) =$
$$\xi \cdot \left(\frac{\beta_{e,j_m}^2 + \beta_{\theta,j_m}^2}{\beta_c^2}\right) + \sum_{j=0}^{H-1} I_t(j; f) \cdot q(j; f) \cdot \left(\frac{\beta_{e,\chi(j;f)}^2 + \beta_{\theta,\chi(j;f)}^2}{\beta_c^2}\right)$$

$P_{est}(f + 1; f) = P_{av}(f) \cdot [1 + P_e(f + 1; f)]$

As noted above, this is the average transmit power that would be needed during frame (f+1), rather than the peak power.

It is also possible to compute the peak transmit power that could be needed and reserve power for the enhanced uplink channels in a probabilistic way. In this case, the mobile station would first compute the possible power that could be needed in the next frame based on pending re-transmissions and rate requests. Then, for each possibility, the mobile station would probabilistically determine whether the corresponding power would be needed or not. The mobile station would then select from among all candidate possibilities the possibility that requires the maximum power. The mobile station assumes that this maximum power will be needed throughout next frame, and performs TFC selection according to the Release 99 methodology.

In block 430, the mobile station reserves power for the "minimum set" of channels on the Release 99 uplink. The uplink may carry various types of data, some of which have high priority and some of which have low priority. High priority data may, for example, include voice data, streaming video or other delay-sensitive data. Low priority data may include various types of data that are not sensitive to transmission delays. The "minimum set" includes the high priority data that needs to be transmitted without delay. Power is therefore reserved for the minimum set in this embodiment. Power is then also reserved for the expected data transmissions on the enhanced uplink, as described above.

After power is reserved for the enhanced uplink transmissions, the highest supported data rate for the Release 99 uplink is recomputed based upon the power limits of the mobile station, minus the power reserved for the enhanced uplink channels. This data rate is then used for the Release 99 uplink transmissions. The retransmissions of the HARQ processes on the enhanced uplink use the same data rates that were used when the processes were originally transmitted. This is necessary because the retransmitted data for the HARQ processes must be identical to the originally transmitted data.

The recomputation of the highest supported data is performed as follows. Once the mobile station computes the average transmit power for the enhanced uplink channels, it needs to eliminate DPDCH TFC from SUPPORTED STATE in accordance with the priority rules.

Let us define:
$g_d(i)$=Priority for DPDCH TFC i
$S_d(f)$=Set of DPDCH TFC in Supported State at the end of frame f
$g_e(i)$=Priority for E-DPDCH TF i
$S_e$=E-DPDCH TFS If DPDCH always has the highest priority, there is no issue, as shown below.

$$S_{d,o}(f) = \{i: g_d(i) < g_e(j) \forall\ i \in S_d(f),\ j \in S_e\}$$
$$= \text{Set of } DPDCH\ TFC \text{ in Supported State with less priority than } E\text{-}DPDCH$$

$$\Rightarrow \text{if } S_{d,o}(f) = \text{Null set} \Rightarrow \text{No issue in } TFC \text{ selection}$$

$$S_{d,o}^c(f) = S_d(f) - S_{d,o}(f)$$
$$= \text{Complement of } S_{d,o}(f)$$

Define:

$$\beta_{d,m} = \max_i \{\beta_{d,i} \forall\ i \in S_{d,o}^2(f)\}$$

The expected available power for DPDCH TFC with lower priority than E-DCH is:

$$P_{d,a}(f+1;f) = \max\left\{P_{max} - P_{av}(f) \cdot \left[1 + \left(\frac{\beta_{d,m}}{\beta_c}\right)^2 + P_e(f+1;f)\right], 0\right\}$$

Therefore, we have:

$$\Psi_d(f+1) = S_{d,o}^c(f) \cup \left\{i: \beta_{d,i} < \sqrt{\frac{P_{d,a}(f+1;f)}{P_{av}(f)}} \cdot \beta_c \forall\ i \in S_{d,0}(f)\right\}$$
$$= \text{Candidate set of } DPDCH\ TFC \text{ for frame } (f+1)$$

The mobile station then chooses the DPDCH TFC from the candidate set shown above.

As noted above, although the foregoing description focuses on embodiments that are implemented in wireless communication systems that are designed in accordance with 3GPP standards (particularly Release 99 and Release 6,) other embodiments may be implemented in systems that do not meet these standards. Alternative embodiments of the invention may vary from the above description in various other ways as well.

For example, in one embodiment, it is not necessary to reserve power for the primary (e.g., Release 99) uplink prior to estimating the power requirements for the enhanced uplink channels. One method in accordance with this embodiment would consist of estimating power requirements for pending HARQ processes on the enhanced uplink, reserving the estimated amount of power for the pending HARQ processes, and then determining the highest data rate that is supported on a primary uplink after power is reserved for the pending HARQ processes on the enhanced uplink.

Although not discussed in detail above, it should also be noted that the mobile station or other wireless transceiver may be implemented by providing suitable programs in a programmable device. The structure of the transceiver typically includes one or more processors that implement the functionality of the device (such as probability tracking rate selection) by executing corresponding program instructions. These program instructions are typically embodied in a storage medium that is readable by the one or more processors. Such a storage medium embodying program instructions for implementing the functionality described above is an alternative embodiment of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

One or more of the steps of the methods and/or algorithms described in connection with the embodiments disclosed herein may be interchanged without departing from the scope of the invention. The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data at a selected rate over a wireless communications network, comprising:
   allocating power on a channel in the wireless communication network for data transmission based on an amount of power required to transmit data at a particular rate during a previous interval, wherein allocating power on the channel comprises determining a plurality of possible transmission power requirements, and
   selecting a maximum transmission power requirement from the plurality of possible transmission power requirements;
   wherein determining the plurality of possible transmission power requirements comprises:
     probabilistically determining, for each one of a plurality of transmission power requests, whether a corresponding transmission power requirement is needed for transmission; and
     considering only those transmission power requests probabilistically determined to require the corresponding transmission power requirement as candidates for the plurality of possible transmission power requirements.

2. The method of claim 1, wherein the probability associated with the number of previous data transmissions is based on a historical probability of values associated with numbers of attempted transmissions of data.

3. The method of claim 2, wherein the probability associated with the number of previous data transmissions is further based on a long term residual block error rate (BLER).

4. The method of claim 1, wherein the channel comprises a primary channel, and wherein data is transmitted over a secondary channel, the method further comprising:
   allocating power for data transmissions on the primary channel so that a sum of the allocated power for data transmission on the secondary channel and power allocated for data transmission on the primary channel does not exceed a maximum transmission power level;
   transmitting on the secondary channel using the power allocated for the data transmission on the secondary channel; and
   transmitting on the primary channel using the power allocated for data transmission on the primary channel.

5. The method of claim 4, wherein the power for data transmissions on the primary channel is allocated prior to allocating power for the data transmission on the secondary channel in the succeeding frame.

6. The method of claim 4, wherein the power allocated for data transmissions on the primary channel is allocated for a minimum set of data.

7. The method of claim 4, further comprising selecting a data rate for data transmissions on the primary channel.

8. The method of claim 7, wherein selecting the data rate for transmission of data on the primary channel comprises selecting a highest supported data rate that is no greater than a maximum data rate specified by a base station.

9. The method of claim 8, further comprising determining which of a plurality of data rates are supported based on information corresponding to a set of preceding frames.

10. An apparatus configured to transmit data at a selected rate over a wireless communications network, comprising:
    means for allocating power on a channel in the wireless communication network for data transmission based on an amount of power required to transmit data at a particular rate during a previous interval, wherein allocating power on the channel comprises determining a plurality of possible transmission power requirements, and
    means for selecting a maximum transmission power requirement from the plurality of possible transmission power requirements;
    wherein determining the plurality of possible transmission power requirements comprises:
      probabilistically determining, for each one of a plurality of transmission power requests, whether a corresponding transmission power requirement is needed for transmission; and
      considering only those transmission power requests probabilistically determined to require the corresponding transmission power requirement as candidates for the plurality of possible transmission power requirements.

11. The apparatus of claim 10, wherein the probability associated with the number of previous data transmissions is based on a historical probability of values associated with numbers of attempted transmissions of data.

12. The apparatus of claim 11, wherein the probability associated with the number of previous data transmissions is further based on a long term residual block error rate (BLER).

13. The apparatus of claim 10, wherein the channel comprises a primary channel, and wherein data is transmitted over a secondary channel, the apparatus further comprising:
    means for allocating power for data transmissions on the primary channel so that a sum of the allocated power for data transmission on the secondary channel and power allocated for data transmission on the primary channel does not exceed a maximum transmission power level;
    means for transmitting on the secondary channel using the power allocated for the data transmission on the secondary channel; and
    means for transmitting on the primary channel using the power allocated for data transmission on the primary channel.

14. The apparatus of claim 13, wherein the power for data transmissions on the primary channel is allocated prior to allocating power for the data transmission on the secondary channel in the succeeding frame.

15. The apparatus of claim 13, wherein the power allocated for data transmissions on the primary channel is allocated for a minimum set of data.

16. The apparatus of claim 13, further comprising means for selecting a data rate for data transmissions on the primary channel.

17. The apparatus of claim 16, wherein the means for selecting the data rate for transmission of data on the primary channel are configured to select a highest supported data rate that is no greater than a maximum data rate specified by a base station.

18. The apparatus of claim 17, further comprising means for determining which of a plurality of data rates are supported based on information corresponding to a set of preceding frames.

19. An apparatus configured to transmit data at a selected rate over a wireless communications network, comprising:
a transmitter; and
a processing system coupled to the transmitter and configured to:
allocate power on a channel in the wireless communication network for data transmission based on an amount of power required to transmit data at a particular rate during a previous interval, wherein allocating power on the channel comprises determining a plurality of possible transmission power requirements, and
select a maximum transmission power requirement from the plurality of possible transmission power requirements;
wherein determining the plurality of possible transmission power requirements comprises:
probabilistically determining, for each one of a plurality of transmission power requests, whether a corresponding transmission power requirement is needed for transmission; and
considering only those transmission power requests probabilistically determined to require the corresponding transmission power requirement as candidates for the plurality of possible transmission power requirements.

20. The apparatus of claim 19, wherein the probability associated with the number of previous data transmissions is based on a historical probability of values associated with numbers of attempted transmissions of data.

21. The apparatus of claim 20, wherein the probability associated with the number of previous data transmissions is further based on a long term residual block error rate (BLER).

22. The apparatus of claim 19, wherein the channel comprises a primary channel, and wherein data is transmitted over a secondary channel, the processing system further configured to:
allocate power for data transmissions on the primary channel so that a sum of the allocated power for data transmission on the secondary channel and power allocated for data transmission on the primary channel does not exceed a maximum transmission power level;
the transmitter configured to:
transmit on the secondary channel using the power allocated for the data transmission on the secondary channel; and
transmit on the primary channel using the power allocated for data transmission on the primary channel.

23. The apparatus of claim 22, wherein the power for data transmissions on the primary channel is allocated prior to allocating power for the data transmission on the secondary channel in the succeeding frame.

24. The apparatus of claim 22, wherein the power allocated for data transmissions on the primary channel is allocated for a minimum set of data.

25. The apparatus of claim 22, further comprising means for selecting a data rate for data transmissions on the primary channel.

26. The apparatus of claim 25, wherein selecting the data rate for transmission of data on the primary channel comprises selecting a highest supported data rate that is no greater than a maximum data rate specified by a base station.

27. The apparatus of claim 26, the processing system further configured to determine which of a plurality of data rates are supported based on information corresponding to a set of preceding frames.

28. A non-transitory computer readable medium encoded with a computer program, the computer program comprising instructions executable to:
allocate power on a channel in the wireless communication network for data transmission based on an amount of power required to transmit data at a particular rate during a previous interval, wherein allocating power on the channel comprises determining a plurality of possible transmission power requirements, and
select a maximum transmission power requirement from the plurality of possible transmission power requirements;
wherein determining the plurality of possible transmission power requirements comprises:
probabilistically determining, for each one of the plurality of transmission power requests, whether a corresponding transmission power requirement is needed for transmission; and
considering only those transmission power requests probabilistically determined to require the corresponding transmission power requirement as candidates for the plurality of possible transmission power requirements.

* * * * *